United States Patent Office 3,507,795
Patented Apr. 21, 1970

3,507,795
COMPOSITION FOR REMOVAL OF COPPER AND COPPER OXIDE SCALES FROM BOILERS
George S. Gardner, Elkins Park, Pa., assignor to Amchem Products, Inc., Ambler, Pa., a corporation of Delaware
No Drawing. Filed Dec. 9, 1966, Ser. No. 600,358
Int. Cl. C02b 5/06, 5/02
U.S. Cl. 252—87
14 Claims

ABSTRACT OF THE DISCLOSURE

This invention relates to an industrial process and solutions for use therein, and more particularly to a process for treating boilers for the removal of copper and copper oxides from the interior surfaces thereof. The process and solutions are also useful in other environments where it is desired to remove copper from iron and steel surfaces.

In accordance with the invention, copper and copper oxide components of scale can be removed from ferrous surfaces by treating the surfaces with solutions containing nitrite ion, copper ion, and a water soluble monobasic organic acid having the formula

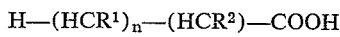
$$H\text{---}(HCR^1)_n\text{---}(HCR^2)\text{---}COOH$$

where $R^1$ is selected from the group consisting of hydrogen and hydroxyl, and $R^2$ is selected from the group consisting of hydrogen and hydroxyl, and $n$ is an integer of from 0 to 4. Acetic acid is the preferred acid from this group; other examples include propionic, butyric, valeric acid, etc. Chloride ion may also be advantageously employed in the treating solutions. It has been found that these solutions efficiently dissolve copper and copper bearing scale components with no substantial attack on the underlying ferrous surface. A significant discovery underlying the invention is that the deliberate inclusion of copper ion in the treating solutions results in complete reversal of their chemical action, converting them from solutions which preferentially attack iron instead of copper, to solutions which preferentially attack copper and not iron.

---

During the course of operation of boilers, heat exchangers and other steam generating equipment, collectively referred to herein as boilers, there occurs a buildup of scale formation on the interior or operating surfaces of said boilers, which scale consists primarily of oxides of iron. Usually boiler units are associated with equipment such as condensers that are constructed of copper alloys, and the scale produced inside the boiler surfaces is frequently found to contain copper as well as iron oxides.

Scale accumulation is undesirable for the reason that it reduces the efficiency of heat transfer throughout the boiler surfaces and considerably complicates effective operation of boiler units. As a result of this scale formation, it is periodically necessary to subject such boilers to thorough cleaning operations for purposes of removing scale formation. These cleaning operations comprise multiple stages and are prohibitively time consuming. They also frequently necessitate the use of high temperatures, to about 200° F., for effective results.

Many different types of cleaning operations have been proposed. Usually, these involve the use of aqueous acidic solutions containing mineral acids or even organic acids such as citric, glycolic, formic or acetic.

Probably the most common method of cleaning such boilers involves, as one step, the use of a strong mineral acid, particularly hydrochloric acid, for purposes of dissolving the scale. Although utilization of corrosion inhibitors with mineral acids for cleaning operations has generally prevented acid attack on the boiler surfaces, such acid treatments have not been universally successful, because when the scale contains copper or copper oxides, metallic copper is not dissolved, and such copper that is dissolved is redeposited or plated as elemental copper throughout the interior of the boiler surfaces. Such copper deposition serves to accelerate corrosion, particularly in the presence of dissolved ferrous ions, and to interfere with heat exchange reactions.

Attempts have been made to utilize various additives in the acid cleaning stage, such as for example thiourea and methylolthiourea compounds which are designed to prevent redeposition of copper from the acidic solutions. While these compounds effectively prevent redeposition of copper, in practice they have not always been completely successful in their ability to chelate or to sequester all of the copper contained in the acid cleaning solutions so that complete prevention of copper redeposition is not uniformly achieved. Other methods proposed in attempts to circumvent this problem have involved the use of alkaline cleaning systems. These systems are designed to dissolve and to chelate copper ion and thus effectively prevent its deposition on interior boiler surfaces. However, for various reasons these alkaline systems have not found favor in the cleaning of industrial boilers.

While these various prior art treatments have enjoyed limited success they have been unable to provide consistently satisfactory results such as is demanded in the industrial field. Inasmuch as the shut-down time of boiler equipment may represent several days of lost capacity, it is apparent that there exists a need for a rapid as well as an effective cleaning process for industrial boilers.

With the foregoing in mind, the principal object of this invention is the provision of an industrial process for the rapid removal of copper and copper oxides from interior boiler surfaces, which process may be operated at room temperature, thereby obviating the need for supplying heat input for industrial cleaning operations, and which process is operative without corrosive attack on the interior boiler surfaces.

Another object of this invention is the provision of solutions which are especially useful in removing copper-containing components from boiler scale during cleaning operations.

A further object of the invention is the provision of processes and solutions for removing copper and copper oxides from iron and steel surfaces with substantially no dissolution of the underlying ferrous material.

The present invention is based upon the discovery that industrial boilers may effectively be freed from copper and copper oxides if they are alternatively subjected to conventional acid cleaning, and either prior to or thereafter, they are treated with an aqueous acid solution having a pH of from 2.5 to 5 and consisting essentially of:

(1) Nitrite ion, calculated as $NaNO_2$,
(2) Copper ion, calculated as Cu, and
(3) A water soluble, monobasic organic acid having the formula $H\text{---}(HCR^1)_n\text{---}(HCR^2)\text{---}COOH$ where $R^1$ is selected from the group consisting of hydrogen and hydroxyl, and $R^2$ is selected from the group consisting of hydrogen and hydroxyl, and $n$ is an integer of from 0 to 4.

It has been known in the art to strip platings from iron by the use of nitrite ions in solutions that contain hydrogen ions in low concentrations, it being thought that the iron is passivated by the nitrite. Specifically, it has been suggested that plated iron be stripped by heating it with a solution containing nitrite ion in excess and acetic acid as the hydrogen ion source. However, such a process has the disadvantage that considerable iron is nonetheless dissolved in the course of removing the plating, as will be clear from the examples discussed below, especially Example 1, bath 1, and Experiment 3 of Example 2. And this prior art practice does not suggest that the deliberate addition of copper ion to an aqueous solution containing nitrite and an acid of the kind defined above would produce a solution in which the redeposition of dissolved copper ion is prevented and the attack of the solution on iron virtually eliminated. These results were totally unexpected.

The amount of copper ion, calculated as Cu, which must be added to the aqueous solution of nitrite ion and organic acid compound is critical and must be from 10 to 1000 parts per million (p.p.m.) of copper. If copper ion is not added to the aqueous organic acid/nitrite solution when such solution is initially brought into contact with the interior boiler surfaces, such solution preferentially will attack the base metal comprising the boiler components and cause dissolution thereof, thus leading to serious structural weakening of the boilers. Moreover, where such solution does not initially contain copper ion in the concentration required, the small amount of copper which is dissolved by virtue of the action of the acidic solution will be chemically plated onto the interior boiler surfaces and thus will not be thoroughly removed by the acid treatment.

The concentrations of copper given above are for the deliberately included copper which is initially present in the solution in accordance with the invention. As the solution is contacted with copper and copper oxide bearing boiler scale, the copper concentration may rise above 1000 parts per million as the solution dissolves the copper components of the scale. Such increase in copper concentration does not impair effectiveness of the solution.

Where the amount of copper ion, calculated as Cu, initially present is in excess of 1000 p.p.m., no apparent enhancement of results is obtained, so that 1000 p.p.m. of initial copper concentration appears to be the upper practical limit for a process of the present invention.

The amount of nitrite ion, calculated as $NaNO_2$, which must be employed in the treating solutions of this invention must be at least 0.25 gram/liter. Where less than 0.25 gram/liter of nitrite ion is employed, the rate of copper dissolution will be too slow for practical and economical industrial utilization, and the improved results otherwise obtainable with this invention will not be realized. With respect to an upper limit on nitrite concentration, it has been found that there is no apparent limitation, so long as the nitrite ion is soluble in the acidic solution. However, as a practical matter, it has been found desirable to restrict the nitrite constituent to about 100 grams/liter, calculated as $NaNO_2$, because where larger amounts are employed, the loss of nitrite ion as a result of decomposition is proportionately greater, thereby resulting in unnecessary waste of this component.

The nitrite ion is preferably introduced into the aqueous acid treating solution through use of an alkali metal salt thereof, for example sodium or potassium nitrite, both of which are standard articles of commerce, and both of which are readily soluble in the aqueous acid solution of this invention.

The water soluble, monobasic organic acids which have been found to be suitable for use in the process of this invention, and which conform to the above presented generic formula, include acetic, propionic, butyric, valeric, glycolic, lactic and gluconic acids. The amount of organic acid which must be employed in the treating solutions of this invention will vary somewhat depending upon which particular acid is chosen. For example, where acetic acid is employed it is preferred to utilize from about 5 to about 20 grams of this acid per liter of treating solution, although where relatively large amounts of nitrite ion are used, for example 100 to 150 g./l., larger amounts of organic acid are tolerable, for example, up to 50 to 170 grams/liter.

Where a longer chain organic acid is employed, such as gluconic acid, relatively larger amounts of the acid, up to about 70 grams/liter, are preferred in order to insure complete or substantial removal of the undesirable copper component without replating on the interior surfaces of the boilers being treated. Generally, it has been found that passivation of steel surfaces so as to retard or substantially to eliminate dissolution thereof while simultaneously dissolving copper ion and preventing such copper from replating under the boiler surfaces is accomplished when a weight ratio of acid to nitrite (calculated as $NaNO_2$) is between about 0.2 and 4.0. When the ratio between acid and nitrite is increased the effectiveness of the solution for dissolving copper increases. However, as the acidity of the solution increases, the rate of nitrite decomposition also increases so that in the interests of economy, it is preferred to utilize a solution wherein nitrite is sufficiently stable under operating conditions to accomplish the desired cleaning operation. Within the above ratios this condition can be attained by giving attention to the pH parameter, especially the preferred pH range, as will be discussed below. It can generally be stated that while the amount of organic acid which is used may vary over a wide range, consistent with maintenance of solution pH, it should be present in an amount of at least 1 gram/ liter so as to insure sufficient solution activity for purposes of dissolving copper and copper oxide components from interior boiler surfaces.

A preferred organic acid has been found to be acetic acid, since this particular additive provides optimum copper removal consistent with maximum economy and efficiency of operation.

In addition to the foregoing essential requirements it is also necessary that the pH in the treating solution be maintained between the values of 2.5 and 5, as measured by standard glass electrode determination. When a pH value lower than 2.5 is utilized the treating solution will rapidly lose its effectiveness for dissolution of copper and copper oxide as a result of decomposition of the essential nitrite component contained therein. Conversely, where the treating solution pH rises above 5 there will be essentially no dissolution of copper and copper oxides from interior boiler surfaces so that the solution will be essentially inoperative. A preferred pH range is between the values of 3 and 4 since it has been found that optimum copper dissolution is achieved within this range, consistent with minimum nitrite decomposition. Maintenance of the required pH range is usually accomplished by use of sufficient organic acid to achieve the desired operating pH. If necessary, however, the pH adjustments may be made utilizing hydrochloric or sulphuric acid in amounts sufficient to provide the desired pH range.

It has surprisingly been discovered that the process of the present invention can be operated in the presence of chloride ion. Furthermore, this particular ion has been found to enhance copper dissolution from interior boiler surfaces without adversely affecting desired passivity of the base metal surfaces. The amount of chloride ion which has been found to impart this surprising result may range from as little as 0.01% by weight to as much as 0.3% calculated as HCl.

The chloride ion may be included as an added component of the solutions used in the process of this invention. Furthermore, as pointed out above, the nitrite bearing solutions are desirably used as one stage of a boiler cleaning operation, another stage of which includes contacting the scaled surfaces with hydrochloric acid bearing solution. If the hydrochloric acid stage is used first, and the nitrite bearing stage second, and if the structure of the boiler is such that it can be drained of the hydrochloric acid stage so thoroughly that the residual hydrochloric acid will not result in a chloride concentration above about 0.3 percent, calculated as HCl, in the nitrite bearing solution when it is introduced, then no intermediate rinsing operation is necessary. Since such rinsing operations between active stages of the cleaning operation are themselves quite time consuming, the foregoing discovery can produce a substantial advantage over prior art operations in which intermediate rinses are indispensable.

With respect to temperature of operation it has been found that the process of the present invention functions completely satisfactorily over a wide variation of temperatures. For example completely acceptable results have been obtained not only at average room temperature (70° F.) but even at temperatures as low as 50–60° F. Conversely, completely satisfactory results have been obtained when the process of the present invention has been operated at elevated temperatures even as high as 200° F. However, since no enhancement of results appears to be obtained when utilizing temperatures higher than average room temperature, it is preferred to operate the process at room temperature for purposes of realizing the economic benefits of a room temperature industrial process.

In order to illustrate the surprising results arising from the treatment process of the present invention there are presented below a series of experiments which are given solely by way of illustration and which are not in any way intended to be construed as a limitation of this invention.

EXAMPLE I

Solutions were prepared containing acetic acid, sodium nitrite and water in which the volume of each solution totalled 100 milliliters. pH determinations were made prior to conducting treatments of weighed specimens each of copper and steel, which specimens were completely immersed in the treating solution. The operating temperature was 73° F., and the duration of the treatment was 3 hours. Results are reported below in Table 1, from which it is readily apparent that the addition of as little as 10 p.p.m. of copper ion (added as copper acetate) results in an almost complete reversal in the chemical action of the treating baths.

TABLE 1

| Bath Component | Bath 1 | Bath 2 |
|---|---|---|
| NaNO$_2$, grams/liter | 5 | 5 |
| Acetic acid, grams/liter | 5 | 5 |
| Cu. p.p.m. | | 10 |
| pH | 3.6 | 3.7 |
| Mg. weight loss of: | | |
| Fe | 50 | 0.2 |
| Cu | 0.2 | 38.5 |

In the experiments of this example, as well as in the experiments of all of the examples discussed below, no copper was redeposited on the iron. That is to say, the material dissolved from the copper specimen, as represented by its net weight loss, remained in solution.

The foregoing results show clearly that the addition of a small amount of copper to the solution of Example 1 reverses the chemical action of the solution, and results in the preferential dissolution of copper with essentially no attack on the basic ferrous metal.

EXAMPLE 2

This example demonstrates the results obtained from different water soluble monobasic organic acids when employed in accordance with the invention and also when employed without the use of copper ion. All of the experiments reported below are based upon the use of a temperature of 160° F. In each instance when copper was employed it was added as copper acetate. The length of treatment of each experiment is shown in Table 2, as are the weight losses for immersed copper and steel specimens.

TABLE 2

| Experiment No. | NaNO$_2$ g./l. | Cu, mg./l. | Acid Type | G./l. | pH | Time, Min. | Wt. loss, mg. Fe | Wt. loss, mg. Cu |
|---|---|---|---|---|---|---|---|---|
| 3 | 40 | None | Acetic | 40 | 3.8 | 20 | 179 | 162 |
| 4 | 40 | 400 | do | 40 | 4.0 | 60 | 3.6 | 772 |
| 5 | 40 | 400 | Gluconic | 50 | 3.8 | 60 | 0.7 | 456 |
| 6 | 40 | 400 | Lactic | 48 | 3.9 | 60 | 0.9 | 311 |
| 7 | 40 | 400 | Glycolic | 56 | 3.8 | 60 | 2.0 | 440 |

All bath pH's were initially adjusted utilizing 50% NaOH solution. The satisfactory results obtainable by the treatment of the present invention is amply demonstrated with different acids in foregoing Table 2.

EXAMPLE 3

In order to illustrate the surprising effects when chloride ion is included in the treating solutions of this invention there is presented below a series of experiments which show the increased activation of an acetic acid/nitrite solution otherwise prepared in accordance with this invention.

All of the experiments reported in Table 3 were based on the use of temperatures of 75° F. and 3-hour treating cycles for immersed copper and steel specimens. All solutions contained 200 mg. copper (added as copper acetate).

TABLE 3

| Experiment No. | NaNO$_2$, g./l. | Acetic acid, g./l. | Cl, p.p.m. | pH | Wt. loss, mg. Fe | Wt. loss, mg. Cu |
|---|---|---|---|---|---|---|
| 8 | 20 | 20 | | 3.6 | 0.6 | 323 |
| 9 | 20 | 20 | 20 | 3.6 | 0.3 | 383 |
| 10 | 20 | 20 | 80 | 3.6 | 0.7 | 410 |
| 11 | 20 | 20 | 160 | 3.5 | 0.3 | 435 |

The foregoing results present clear demonstrations of the surprising results achieved in accordance with this invention.

EXAMPLE 4

In order to determine the utility of nitrite ion (calculated as NaNO$_2$) over a wide range of concentrations, a series of experiments were performed, over a two-hour period, at temperatures indicated in Table 4, wherein 100 mg. of copper ion (added as CuCl) were added to each solution. The rate of dissolution of copper and of steel test strips, immersed in the respective solutions, is recorded in the table.

TABLE 4

| Experiment No. | NaNO$_2$, g./l. | Acetic acid | pH | Temp., °F. | Wt. loss, mg. Fe | Wt. loss, mg. Cu |
|---|---|---|---|---|---|---|
| 12 | 0.1 | 1 | 3.8 | 150 | 37 | 3 |
| 13 | 0.25 | 1 | 3.8 | 150 | 0.1 | 4 |
| 14 | 0.5 | 1 | 3.8 | 150 | 0.1 | 5 |
| 15 | 1 | 1 | 3.9 | 150 | 0.3 | 6 |
| 16 | 10 | 10 | 3.5 | 75 | 0.5 | 103 |
| 17 | 50 | 50 | 3.4 | 75 | 0.7 | 584 |
| 18 | 100 | 100 | 3.5 | 75 | 0.7 | 1,200 |
| 19 | 200 | 100 | 3.4 | 75 | 0.7 | 1,898 |
| 20 | 400 | 130 | 3.5 | 75 | 0.9 | 2,264 |
| 21 | 800 | 170 | 3.6 | 76 | 1.1 | 1,966 |

From the above results it is apparent that although very rapid dissolution of copper is obtained at high nitrite and acid concentrations, the process of the present invention is operable over a very wide range of concentrations of active acid constituents.

A typical boiler cleaning operation conducted in accordance with the invention can now be described. A boiler having a tube capacity of approximately 19,000 gallons, and containing boiler scale of the kind which is a normal incident of operation, was first charged with a mineral acid cleaning solution. The solution employed was 6% by weight hydrochloric acid, with 0.1% by volume of an acid in a corrosion inhibitor prepared according to U.S. Patent No. 2,758,970. The acid was held in the boiler for 8½ hrs. At the end of this period, the acid temperature was about 140° F.

The next step in the cleaning operation consisted of draining the hydrochloric acid solution from the boiler, during which draining the system was charged with nitrogen.

The draining of the boiler required about 90 minutes. Following the draining, the boiler tubes were filled with rinse water, which was drained from the boiler.

In preparation for the next stage of the boiler cleaning operation, two solutions were prepared and held in feed tanks. One solution contained 350 lbs. of copper sulfate (CuSO$_4$.5H$_2$O) and 1600 lbs. of sodium nitrate in 700 gallons of water. The other solution consisted of 208 gallons of glacial acetic acid dissolved in 500 gallons of water.

These two solutions, together with water, were pumped into the boiler concurrently. The feed rates were as follows:

|     |     | G.p.m. |
| --- | --- | --- |
| (1) | Water | 200 |
| (2) | Acetic acid solution | 35 |
| (3) | Nitrate-copper solution | 54 |

These three liquid streams were fed to the boiler water until it was about ¼ full. Then water alone was pumped into the boiler until it was filled to a level about six inches above the normal operating level.

It should be noted that when, in the practice of the invention, aqueous solutions of nitrite and organic acids are being mixed, care should be taken to avoid temporary or localized conditions of high acid concentrations with respect to nitrite concentraions, in order to avoid rapid decomposition of the nitrite by the highly acidic solutions. The blending and feed steps just described are an illustration of a suitable technique for blending and feeding nitrite and acid while at the same time avoiding nitrite decomposition.

Nitrogen gas was introduced into the boiler to provide mild agitation of the cleaning solution. The solution was held in the boiler for about four hours, throughout which time the temperature remained below 100° F.

The boiler was then drained, after which it was in condition to be placed back on stream. A material balance based on analyses of the cleaning solution charged to the boiler, revealed the following:

|     | Lbs. |
| --- | --- |
| Copper charged to the boiler | 89 |
| Copper found in spent cleaning solution drained from boiler | 171 |
| Copper removed from boiler tubes (the difference) | 82 |

These figures clearly demonstrate the effectiveness of the process and solutions of the present invention in the removal of copper components of boiler scale.

I claim:

1. A process for removing copper and copper oxide components of scale formed on the operating surfaces of boilers comprising contacting said surfaces with an aqueous solution having a pH of from about 2.5 to about 5, and consisting essentially of at least 0.25 gram/liter nitrite ion, calculated as NaNO$_2$, from about 10 to about 1000 parts per million of copper ion calculated as Cu, and at least 1 gram/liter of a water soluble, monobasic organic acid having the formula:

$$H-(HCR^1)_n-(HCR^2)-COOH$$

where R$^1$ is selected from the group consisting of hydrogen and hydroxyl, and R$^2$ is selected from the group consisting of hydrogen and hydroxyl, and $n$ is an integer of from 0 to 4.

2. A process for removing copper and copper oxide components of scale formed on the operating surfaces of boilers comprising contacting said surfaces with an aqueous solution having a pH of from about 2.5 to about 5, and consisting essentially of between about 0.25 gram/liter and 100 grams/liter nitrite ion, calculated as NaNO$_2$, an initial concentration of copper ion, in an amount from about 10 to about 1000 parts per million, calculated as Cu, and a water soluble monobasic acid in an amount such that the weight ratio of acid to nitrite (calculated as NaNO$_2$) is between about 0.2 and about 4.0 said acid having the formula:

$$H-(HCR^1)_n-(HCR^2)-COOH$$

where R$^1$ is selected from the group consisting of hydrogen and hydroxyl, and R$^2$ is selected from the group consisting of hydrogen and hydroxyl, and $n$ is an integer of from 0 to 4.

3. A process in accordance with claim 1 in which said aqueous solution also contains from about 0.01 percent to about 0.3 percent chloride, calculated at HCl.

4. A process according to claim 1 wherein said water soluble monobasic organic acid is acetic acid and wherein said acetic acid is present in an amount from about 5 to about 20 grams/liter.

5. A process according to claim 1 wherein the pH of said aqueous solution is from about 3.0 to about 4.0.

6. A process according to claim 1 wherein the concentration of said acid is less than about 170 grams/liter.

7. A process for removing copper and copper oxide components of scale from ferrous surfaces of boilers comprising contacting said surfaces with an aqueous solution having a pH of from about 2.5 to about 5, and consisting essentially of at least 0.25 gram/liter nitrite ion, calculated as NaNO$_2$, from about 10 to about 1000 parts per million of copper ion calculated as Cu, and at least 1 gram/liter of a water soluble, monobasic organic acid having the formula:

$$H-(HCR^1)_n-(HCR^2)-COOH$$

where R$^1$ is selected from the group consisting of hydrogen and hydroxyl, and R$^2$ is selected from the group consisting of hydrogen and hydroxyl, and $n$ is an integer of from 0 to 4.

8. A process for removing scale formed on the operating surfaces of boilers comprising filling said boiler with a scale dissolving solution containing hydrochloric acid, draining said scale dissolving solution with dissolved scale components therein from said boiler, thereafter filling said boiler with an aqueous solution having a pH of from about 2.5 to about 5 and consisting essentially of at least 0.25 gram/liter nitrite ion, calculated as NaNO$_2$, from about 10 to about 1000 parts per million of copper ion calculated as Cu, and at least 1 gram/liter of a water soluble, monobasic organic acid having the formula:

$$H-(HCR^1)_n-(HCR^2)-COOH$$

where R$^1$ is selected from the group consisting of hydrogen and hydroxyl, and R$^2$ is selected from the group consisting of hydrogen and hydroxyl, and $n$ is an integer of from 0 to 4, said draining of hydrochloric acid containing solution leaving a residual amount of such solution sufficient to supply from about 0.01 percent to about 0.3 percent chloride, calculated as HCl, to the nitrite bearing solution with which the boiler is filled after said draining, and thereafter rinsing said boiler with water.

9. A solution for removing copper and copper oxide components of scale on ferrous surfaces comprising an aqueous solution having a pH of from about 2.5 to about 5, and consisting essentially of at least 0.25 gram/liter nitrite ion, calculated as NaNO$_2$, from about 10 to about 1000 parts per million of copper ion, calculated as Cu, and at least 1 gram/liter of a water soluble, monobasic organic acid having the formula:

$$H-(HCR^1)_n-(HCR^2)-COOH$$

where R$^1$ is selected from the group consisting of hydrogen and hydroxyl, and R² is selected from the group consisting of hydrogen and hydroxyl, and *n* is an integer of from 0 to 4.

10. A solution for removing copper and copper oxide components of scale on ferrous surfaces comprising an aqueous solution having a pH of from about 2.5 to about 5, and consisting essentially of between about 0.25 gram/liter and 100 grams/liter nitrite ion, calculated as $NaNO_2$, an initial concentration of copper ion, in an amount from about 10 to about 1000 parts per million, calculated as Cu, and a water soluble monobasic acid in an amount such that the weight ratio of acid to nitrite (calculated as $NaNO_2$) is between about 0.2 and about 4.0, said acid having the formula:

$$H-(HCR^1)_n-(HCR^2)-COOH$$

where R¹ is selected from the group consisting of hydrogen and hydroxyl, and R² is selected from the group consisting of hydrogen and hydroxyl, and *n* is an integer of from 0 to 4.

11. A solution in accordance with claim 9 and also containing from about 0.01 percent to about 0.3 percent chloride, calculated as HCl.

12. A solution in accordance with claim 9 wherein said water soluble monobasic organic acid is acetic acid and wherein said acetic acid is present in an amount from about 5 to about 20 grams/liter.

13. A solution in accordance with claim 9 wherein the pH of said aqueous solution is from about 3.0 to about 4.0.

14. A solution in accordance with claim 9 wherein the concentration of said acid is less than about 170 grams/liter.

References Cited

UNITED STATES PATENTS

| | | | |
|---|---|---|---|
| 1,837,118 | 12/1931 | Elder | 252—147 |
| 2,049,517 | 8/1936 | Saukaitis | 252—147 |
| 2,351,465 | 6/1944 | Wachter | 252—387 |
| 2,462,638 | 2/1949 | Hetherington | 252—387 |
| 2,675,351 | 4/1954 | Ulmer et al. | 252—181 |
| 3,050,360 | 8/1962 | De Roos et al. | 252—387 |
| 3,074,825 | 1/1963 | Gardner | 134—41 |
| 3,308,062 | 3/1967 | Gunther | 134—41 |

MAYER WEINBLATT, Primary Examiner

I. GLUCK, Assistant Examiner

U.S. Cl. X.R.

21—2.7; 134—3, 41; 252—85, 147, 181, 387, 389

PO-1050
(5/69)

UNITED STATES PATENT OFFICE
CERTIFICATE OF CORRECTION

Patent No. 3,507,795    Dated April 21, 1970

Inventor(s) George S. Gardner

It is certified that error appears in the above-identified patent and that said Letters Patent are hereby corrected as shown below:

Col. 6, Table 4 - Experiment 21 under Temp., °F = for "76" read --75--.

Col. 7, line 15 - for "nitrate" read --nitrite--.

Col. 7, line 25 - for "Nitrate-Copper" read --Nitrite-Copper--.

Col. 7, line 48 - after "boiler" insert --and the spent cleaning solution drained from the boiler--.

Col. 8, line 5 - for "amocnt" read --amount--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents